(12) United States Patent
Kruer et al.

(10) Patent No.: US 6,997,402 B2
(45) Date of Patent: Feb. 14, 2006

(54) UNITIZED MAT TO FACILITATE GROWING WOODY PLANTS

(76) Inventors: Thomas R. Kruer, 543 Garden View, Edgewood, KY (US) 41017; Hugh A. Thompson, 5777 Windermere La., Fairfield, OH (US) 45014

( * ) Notice: Subject to any disclaimer, the term of this patent is extended or adjusted under 35 U.S.C. 154(b) by 0 days.

(21) Appl. No.: 10/785,257

(22) Filed: Feb. 24, 2004

(65) Prior Publication Data

US 2004/0195391 A1 Oct. 7, 2004

Related U.S. Application Data

(63) Continuation-in-part of application No. 10/439,416, filed on May 16, 2003.

(60) Provisional application No. 60/449,325, filed on Feb. 24, 2003, provisional application No. 60/381,070, filed on May 17, 2002.

(51) Int. Cl.
*B05B 15/00* (2006.01)
*A01G 31/00* (2006.01)
*B29C 53/00* (2006.01)

(52) U.S. Cl. ............... 239/542; 239/553.3; 239/553.5; 239/145; 47/62 E; 47/9; 47/4; 47/48.5; 47/21.1; 156/203; 156/217

(58) Field of Classification Search .............. 47/62 E, 47/9, 48.5, 79, 32, 21.1, 32.1, 1.01 F, 1.01 T; 239/542, 450, 553.3, 145, 553.5; 156/203, 156/217, 290, 582, 542
See application file for complete search history.

(56) References Cited

U.S. PATENT DOCUMENTS

| | | | |
|---|---|---|---|
| 3,205,619 A | 9/1965 | Henry | |
| 3,774,850 A | 11/1973 | Zeman | |
| 4,047,995 A * | 9/1977 | Leal-Diaz | 156/203 |
| 4,065,926 A * | 1/1978 | Brandt | 405/36 |
| 4,095,618 A | 6/1978 | Spencer | |
| 4,126,998 A | 11/1978 | Gilead | |
| 4,130,245 A | 12/1978 | Bryson | |
| 4,199,106 A | 4/1980 | Kojimoto et al. | |
| 4,285,472 A * | 8/1981 | Okada et al. | 239/542 |
| 4,473,191 A | 9/1984 | Chapin | |
| 4,833,822 A | 5/1989 | DiGrassi | |
| 5,058,317 A * | 10/1991 | McMurtrey | 47/31.1 |

(Continued)

FOREIGN PATENT DOCUMENTS

DE 4408556 A1 * 9/1994

*Primary Examiner*—David A. Scherbel
*Assistant Examiner*—Seth Barney
(74) *Attorney, Agent, or Firm*—Egbert Law Offices

(57) ABSTRACT

A unitized mat to facilitate growing woody plants includes at least two polymeric material layers, an inlet for delivery of fluid, and at least one outlet for dispensing fluid into an area covered by at least one layer. There is an opening in the layers through which the plant extends along with an installation seam with overlapping ends. The mat includes perforations, aligned or off-set, for fluid outlets and may be used in a container, such that a polymeric material layer covers the surface thereof. Flexible extension flaps adjust for container size and shape. The mat is removably affixed to a container and/or can be fed by a water-filled container with a polymeric material layer integral with the container. The mat may be used for woody plants in a row, such as orchard applications. Extension flaps provide continuous cover around and between plants, and perforations provide anchors for fixable positioning.

28 Claims, 9 Drawing Sheets

U.S. PATENT DOCUMENTS

| | | |
|---|---|---|
| 5,301,633 A | 4/1994 | Lloyd |
| 5,749,109 A | 5/1998 | Kappel |
| 5,839,659 A | 11/1998 | Murray |
| 6,293,477 B1 * | 9/2001 | Chambers .................. 239/542 |

* cited by examiner

UNITIZED MAT TO FACILITATE GROWING WOODY PLANTS

RELATED U.S. APPLICATIONS

The present utility patent application claims priority from Provisional Patent Application Ser. No. 60/449,325 filed on Feb. 24, 2003 and entitled "FLUID DISTRIBUTION PRODUCT FOR WOODY PLANTS", presently pending.

The present utility patent application is a continuation-in-part application of U.S. patent application Ser. No. 10/439,416 filed on May 16, 2003 and entitled "UNITIZED MAT TO FACILITATE GROWING PLANTS", presently pending. The '416 application claims priority from Provisional Patent Application Ser. No. 60/381,070 filed on May 17, 2002 and entitled "FLUID DISTRIBUTION PRODUCT".

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates to a unitized mat to facilitate growing woody plants. More specifically, this invention relates to water flow and a method of achieving very efficient drip irrigation rates for growing woody plants. This invention also relates to weed control devices. The invention relates to combining water distribution within a plastic mulch to realize the benefits of both in one inexpensive and versatile assembly for woody plants. The present invention relates to optimizing growing conditions of woody plants through an inexpensive, durable, and easy-to-install device.

BACKGROUND OF THE INVENTION

There are a variety of different types of systems currently available for distributing water for the irrigation of cultivated plants. Likewise, mulch of various types and materials are currently being produced for the landscaping and horticulture markets, and food production markets.

Drip Irrigation

Of the various forms of irrigation systems, drip or micro-drip irrigation is considered to be the most desirable because they have been shown to save water, reduce the use of horticultural chemicals, are relatively insensitive to environmental effects, reduce labor, and promote superior plant growth as compared to other technologies.

Most importantly, drip irrigation is an effective irrigation system in terms of water conservation. With drip systems, water is not wasted by watering areas between rows or from run-off. Furthermore, the problems of excessive evaporation, wind-effects, and overspray are avoided by putting the water directly onto the ground rather than simulating rainfall. However, drip systems require significant complexity and cost if used to cover an area rather than one location.

All drip irrigation systems share several things in common. They all generally consist of a central water supply transport means, usually a hose or pipe, and numerous water emission device(s). These emission devices are typically called emitters and are designed to dissipate the irrigation water as evenly as possible at low flow rates, i.e. drips. In addition, drip systems all require relatively fine mesh filtration to avoid clogging of the emitters. Finally, some level of pressure regulation is required as most drip irrigation systems operate at pressures between 8 psi and 15 psi. Drip irrigation systems can be categorized as either line source or point source dissipation systems.

Line source distribution systems emit the water uniformly along the full length of the main supply hose. A series of small holes or similar means are positioned along the length and serve to dissipate the pressure and thus the water flow down to a drip. Line source systems are often referred to as soaker hose or drip tape.

In the past, various U.S. patents have issued in the field of line source systems. U.S. Pat. No. 3,205,619, issued on Sep. 14, 1965 to J. W. Henry, discloses an irrigation mulching sheet consisting of an integral irrigating means permitting more economical use of available water while improving ease of installation and stability of the structure. Water is continuously provided along the linear tubing of the sheet.

U.S. Pat. No. 3,774,850, issued on Nov. 27, 1973 to David G. Zeman, discloses a polymeric, preferably biodegradable tube for agricultural use for distributing water to plants located along the length of the tube. The tube includes a plurality of outlet openings so as to restrict the flow of water to each of the outlets. The tube may also have mulch sections along the length of the tube. Preferably the walls of the tube are thin enough to be broken up by normal agricultural instruments such as plows. The tube has limited durability.

U.S. Pat. No. 4,095,618, issued on Jun. 20, 1978 to Lloyd Spencer, describes an irrigation rodent deterrent tube, particularly adapted for drip or trickle irrigation. The tube has a flat configuration when free of internal pressure. The tube also has laterally projecting webs which tend to be the first to be bitten by a rodent while exploring the presence of the irrigation tube. The webs may be enlarged to contain a concentration of a deterrent or toxic material.

U.S. Pat. No. 4,199,106, issued on Apr. 22, 1980 to Takatsuiki Susumu Kojimoto et al., discloses an irrigation hose which is produced by melt-sticking double thermoplastic resin film in a plane along longitudinal parallel lines so as to form a supply passage with communicating holes and constant pressure passages with water-irrigating holes. The invention includes aligning the communicating holes and/or water-irrigating holes to provide irrigating water along the hose.

U.S. Pat. No. 4,473,191, issued in September 1984 to Chapin, discloses a drip tape fabricated from thin plastic material. The drip tape incorporates a series of tortuous paths to accomplish the desired pressure drop and flow reduction. The pre-installed or pre-molded dissemination devices, such as emitters, are positioned along the length of the tape.

U.S. Pat. No. 5,839,659, issued on Nov. 24, 1998 to Eric S. A. Murray, discloses a capillary system that provides water, nutrient solutions and gases such as air to the root zone of plants. The system uses one or more conduits having perforations spaced apart therealong, with the conduits being held in pockets. In use, the capillary system is buried to an appropriate depth in soil below the plants to be irrigated. The upper layer of capillary cloth is wet by the flow out of the perforations and serves to distribute water.

Soaker hose devices, as exemplified by FISKAR Tree Soaker ring, are often made of particulate matter, such as ground-up vehicle tires, that have been compressed with binder into a semi-solid hose-type material. Alternatively, the soaker hose consists of a flat hose which has been punched with holes after manufacture. Both of these types of soaker hose are relatively expensive and some have been known to disintegrate over a short period of time, thus reception by professional and agricultural consumers has not been good.

Drip tape, as exemplified by Delmar in U.S. Pat. No. 5,620,143 is fabricated from a strip of thin plastic material and incorporates a series of tortuous paths to accomplish the desired pressure drop and flow reduction. The pre-installed or pre-molded dissemination devices (emitters or emitter discharge points) are spaced along the length of the device at fixed distances ranging from six inches to 48 inches.

Drip tape is generally less inexpensive to manufacture than soaker hose devices due to the relatively small amount of plastic material being used. Due to the use of low cost materials and thin wall thickness, drip tape is typically designed to last only one or two growing seasons prior to being removed and replaced.

When drip tape systems have been used for the irrigation of uniformly and closely spaced plants (commercial applications) they have had good reception. They have been quite effective as an irrigation technique and as a water conservation vehicle when compared to overhead spray and furrow systems. Because drip tape distributes water evenly over the entire length of a planting bed, some water is wasted or used by weeds between the plants. Thus there is a need to distribute water precisely to the plants being watered and not the space between, while being easy to install.

In applications where plants, in any given plot, can vary in size, spacing, and species, a system having fixed spacing between disseminators such as drip tape may not be preferred due to wasted water. Point source systems are designed for these "random planting" applications.

Point source drip irrigation systems employ emitters installed in the water transport lines as needed, such that the water is disseminated at specific points where the emitters are placed. An advantage of a point source dissemination system is that the irrigation can be "customized" for any plant spacing or size. That is, plants of different sizes and water requirements can be accommodated in the same watering zone by varying the number of emitters and/or their flow rates.

When plants are spaced 2.5 feet apart or greater, experience has shown that point source drip irrigation is the most effective system for saving water. In fact, the further the plants are spaced apart, the more cost-effective point source drip irrigation becomes, on a relative basis, when compared with overhead spray or furrow irrigation systems. When used in landscaping applications, the main tube and emitter lines can be covered with mulch or bark chips and look quite attractive. Of course, after the plant material has matured, these installations look even more attractive.

Another advantage of a point source drip irrigation system is that it can be installed after the plants are in place. Installation is usually quite easy but extremely time consuming. Thus the major disadvantage of these systems is the labor and material expenses associated with the custom installation. The emitters are also prone to clogging with contaminants in the water due to their small passages so expensive filters and/or constant maintenance is required.

Flexible and rigid water-filled containers have been developed to deliver water through small emitters to woody plants. These devices are hard to handle when full of water, deliver much faster than the plant needs, and tend to compress the soil around the plant. Furthermore, they tend to clog due to their contact with wet soil, are expensive, and do not provide any means for evaporation control.

Attempts are currently being made around the world to modify drip irrigation systems so that they deliver less water per emitter. The objective is for the irrigated plants to receive the optimum amount of water over a longer period of the day. These "Ultra Low Drip Irrigation" systems are very complex to operate and clogging represents the major obstacle to achieving the objective of optimum plant growing conditions.

Prior art point source irrigation systems include U.S. Pat. No. 4,126,998, issued on Nov. 28, 1978 to Gideon Gilead, which teaches an irrigation apparatus comprising first and second layers of sheet material. The layers are bonded together at surfaces to define a liquid conduit, having at least one pressure reducing path associated therewith and an exit port from each of the at least one pressure reducing paths. The apparatus is linear and is installed underground.

Thus there is a need for an inexpensive drip irrigation system which does not waste irrigation water between plant sites. There is also a need for a drip irrigation system which is easy to install and remove when no longer needed. Furthermore, there is a need for a drip irrigation system that is able to deliver very small amounts of water at specific plant sites without being prone to clogging.

Woody Plants

As in other applications, a variety of different types of products are currently used to provide irrigation water to woody plants, such as trees and shrubs, grown in containers, landscaping sites, and orchards.

Overhead spray systems are used extensively for this application but are generally inefficient as the airborne water is easily deflected by the plants' foliage. As a result, as little as 20% of the irrigation water is actually delivered to the plants' root system, where it is needed.

Point source drip emitters are often used to irrigate woody plants since they are more effective than overhead spray systems. However, drip emitters employing current technologies have a number of deficiencies. First of all, they typically do not allow low delivery rates. Low delivery rates allow the irrigation water to be absorbed by the soil or growing media. If delivered at the rates provided by existing drip emitters, water easily passes through sandy soil, runs off clay soils, or leaches through the bottom of growing containers. Pulsed and similar "Ultra Low Drip Irrigation" systems have been developed to address this but they are very complex to operate and prone to clogging.

Secondly, as discussed previously, point source drip irrigation systems involve significant complexity and cost when trying to cover an area like the root zone of a woody plant rather than irrigating one point. Uneven water distribution results in the root system of the woody plant not developing uniformly. In response, spray stakes have been developed to spray a fine pattern of water over a wider area. However, spray stakes require a great deal of maintenance to ensure proper orientation and operation. In addition, the fine spray leads to additional evaporation in dry climates.

Thus there is a need for a drip irrigation system that provides low delivery rates without plugging. There is also the need for an inexpensive and irrigation system that provides even distribution of water to the root system of woody plants at the soil surface.

Mulch

There are various forms of mulch used in the home landscaping industry with additional types produced for commercial agriculture applications. The benefits of mulching include; less water evaporation, less weeds, soil warming and heat retention leading to earlier and higher yields, erosion control, and a more uniform appearance. Types of mulch include organic, plastic film, and irrigating mats.

Organic mulch, such as hardwood bark and pine needles, tend to be the most aesthetically pleasing but quickly degrade in the environment or wash away with heavy rains.

Plastic mulch (agricultural film, rings, or geotextiles) are effective weed barriers and are preferred in most commercial applications where they can be placed prior to planting. They are very effective at soil erosion abatement and weed control while minimizing surface water evaporation. The perforated or woven versions which are air and water permeable are proving to be less desirable as weeds take root though the pores and cannot be removed.

In commercial farming, thin agricultural film is typically placed over planting beds after drip tape has been installed. This combination has proven to be very effective at producing high yields of quality product with relatively low water use.

Thus there is a need to combine the water saving benefits of Ultra Low drip Irrigation systems with the many benefits of plastic mulch into an inexpensive, durable, and easy to install product.

Irrigating mats are a recent development in the field of artificial mulch, which employ a layer of water distributing material bonded to the underside of a plastic sheet in order to distribute water over the entire area covered by the mat. The prior art includes U.S. Pat. No. 5,301,633, issued on Apr. 12, 1994 to Thomas G. Lloyd, that teaches a flat and thin bladder device used to cause earthworms to migrate to the earth's surface for easy collection. The bladder is laid flat on the earth's surface and soaks the ground underneath the bladder perforations. Soaking the earth under the bladder causes earthworms to migrate to the surface and they are then easily collected as the bladder is lifted to expose them.

U.S. Pat. No. 6,293,477, issued on Sep. 25, 2001 to Robert J. Chambers, describes an irrigator configured from a flexible or semi-flexible material which can conform to various sizes and shapes of terrain. According to various embodiments of the irrigator, seep holes may be provided. The irrigator contains holes for various plant life to take root through and for facilitating drainage. The irrigator may have multiple, distinct passages for the collection and/or distribution of multiple fluids or gases.

Other related mat devices are taught in U.S. Pat. No. 4,130,245, issued on Dec. 19, 1978 to John D. Bryson and U.S. Pat. No. 5,749,109, issued on May 12, 1998 to Thomas F. Kappel. The Bryson patent teaches a generally flat envelope or package for controllably dispensing into the atmosphere a liquid substance which is normally liquid and vaporizable under atmospheric temperature and pressure conditions. The Kappel patent relates to blankets for use with forced air convection systems, wherein the blankets includes means to provide air through selective areas of the lower sheet of the blanket. These devices relate to using a mat to disburse a fluid throughout the mat, although the application to irrigation and selective plant growth is not addressed.

The failings of prior art irrigation mats include wasting irrigation water between plant sites because the ground becomes soaked without consideration of the location of the plant or root zone of the plant. There is also a need for an irrigation mat which is easy to install and remove when no longer needed. Furthermore, there is a need for an irrigation mat that is able to deliver very small amounts of water at specific plant sites without being prone to clogging. The prior art irrigation mats use materials that are expensive and serve only to redistribute water that is already in the soil rather than actually providing irrigation to the specific plant sites.

With regard to woody plants, mulch products of various types are used extensively in the landscaping and horticulture industry for a number of interdependent reasons. Weeds and turf represent stiff competition for the woody plant and mulch can not minimize the need for expensive herbicides. Water evaporation and runoff can be controlled with an effective mulch. Plastic mulch has proven to be the most durable and the most effective product for weed control and minimizing surface water evaporation. Dark colored plastic mulch can provide soil warming and heat retention leading to earlier and higher yields, with an attractive appearance. Light colored and metalized mulches are effective at minimizing heat build up in containers and reflecting light up into the canopy. A disadvantage of using any plastic mulch is that high winds can disturb the material and result in higher maintenance costs.

Thus there is a need to combine the water saving benefits of Ultra Low drip Irrigation systems with the many benefits of plastic mulch into an inexpensive, durable, secure, and easy-to-install product for growing woody plants.

BRIEF SUMMARY OF THE INVENTION

The present invention is a unitized mat to facilitate growing woody plants comprising at least two polymeric material layers defining fluid-conveying passageways forming distribution headers and a flow restricting means, an inlet means for delivery of a fluid into the distribution headers, and an outlet means for dispensing and metering fluid into a root zone area covered by at least one layer of the polymeric material layers. The polymeric layers are sized and shaped to cover an area immediately around at least one plant. The flow restricting means is in fluid connection with the distribution header and a multi-dimensional array of outlet means.

The polymeric material layers have an opening in which the woody plant extends therethrough. The opening is formed so as to adjustable because woody plants have variable stem size or variable trunk size. The opening can be serrated. There is also an installation seam extending from the opening to an outer edge of the polymeric material layers and having overlapping ends. The overlapping ends maintain coverage of the entire surface.

The present invention relates to the unitized mat with polymeric material layers removably positioned in a container, such that at least one polymeric layer covers an area on a surface of the container. The polymeric material layers have a spring located along an outer circumference of the polymeric material layers. The spring extends the polymeric material layers to cover the surface of the container to the edge of the container. Alternatively, the present invention includes a plurality of flexible extension flaps extending from the outer circumference of the polymeric material layers. The flexible extension flaps allow for variations in container size and shape. The present invention also includes a unitized mat with the polymeric material layers have an outer circumference extending beyond edges of the container. The polymeric material layers can be fixably attached to the outside of the container by known means, such as adhesive strips.

The present invention also relates to a unitized mat with a plurality of outlet means evenly distributed over the area covered by the polymeric material layers. The present invention discloses the plurality of outlet means as perforations extending through the polymeric material layers, such as punched holes. Alternatively, the perforations can be offset between first and second polymeric material layers. The perforations through the first layer only and the perforations through the second layer only are not aligned.

The unitized mat also has anchoring means for restraining the polymeric material layers in the area immediately around at least one plant. Anchoring means such as landscaping staples are applied to the polymeric material layers so as to restrain the mat on the ground or in the container.

Another embodiment of the present invention is a unitized mat with the inlet means in fluid connection with a fluid-filled container. The unitized mat can be connected to a rain barrel or water bag. Furthermore, the polymeric material layers are made integral with the fluid-filled container, such that the bottom of a fluid-filled container is comprised of the polymeric material layers.

For multiple woody plants or orchard applications, the present invention discloses a unitized mat with a plurality of openings through the polymeric material layers in which woody plants extends therethrough. The unitized mat for multiple woody plants has a plurality of flexible extension flaps extending from the outer circumference of the polymeric material layers to overlap and form continuous cover for woody plants spaced in rows.

The above and other objects, features and other advantages of the present invention will be more clearly understood from the following detailed description taken in conjunction with the accompanying drawings.

DETAILED DESCRIPTION OF THE INVENTION

Figure 1:
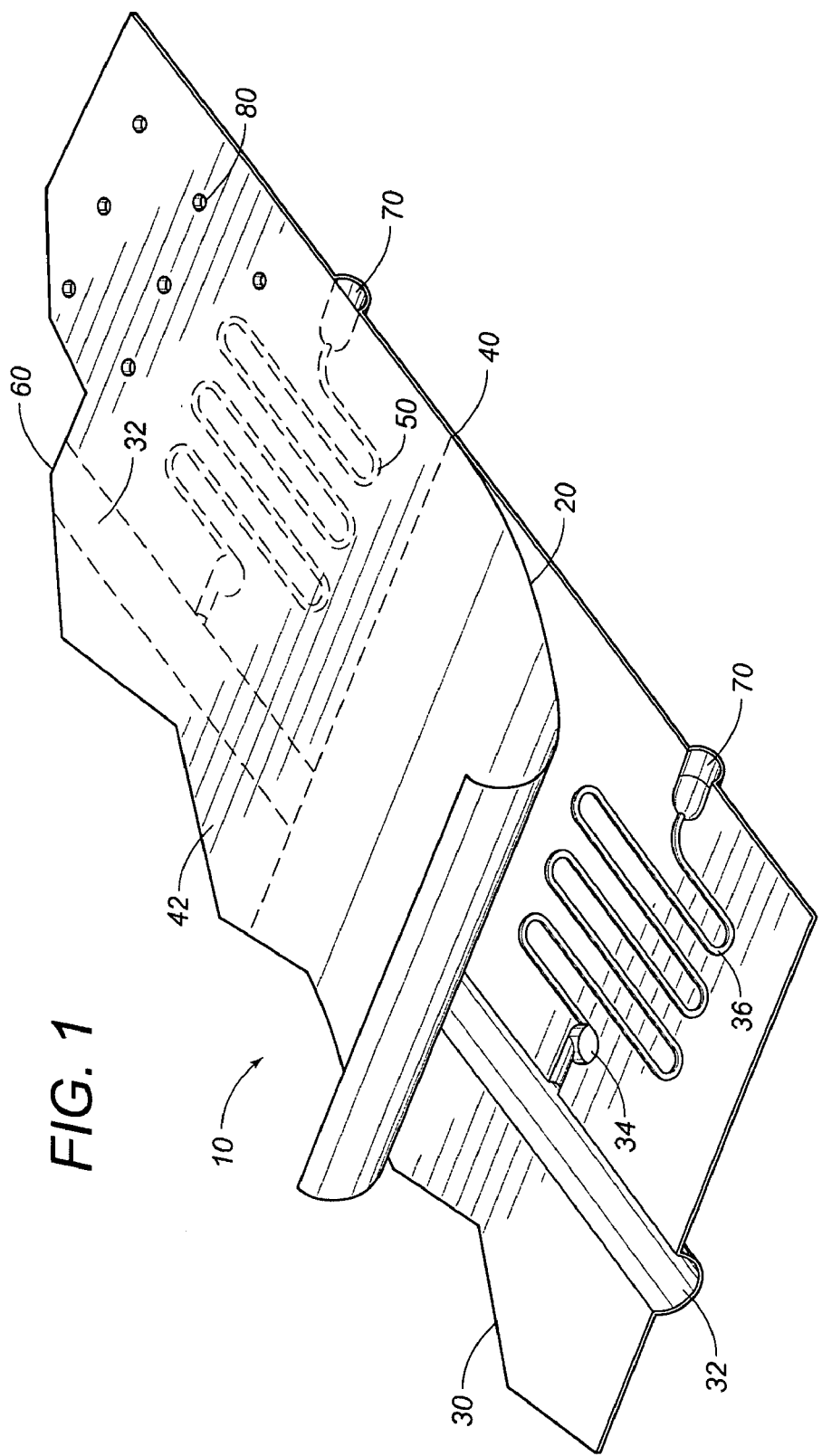
FIG. 1 is a partially exploded perspective view of the basic construction of the present invention.

While the present invention is capable of embodiment in various forms, there is shown in the drawings and will hereinafter be described, a series of presently preferred embodiments with the understanding that the present disclosure is to be considered as an exemplification of the invention, and is not intended to limit the invention to the specific embodiments illustrated.

Referring now to the drawings, and more particularly to FIG. 1, a fluid distribution device generally indicated at 10 as disclosed by this invention is shown to be simple in construction. The invention consists of a bottom layer 20 of water-proof polymeric material having length and width both many times its thickness. Distribution headers 22, flow restricting passageways 24 of long length, and outlet ports 26 may be embossed or molded into the surface of the bottom layer 20. A top layer 30 of thin polymeric material is laminated and selectively bonded to the bottom layer 20 to form a water proof seal 40 in all areas other than those which are to remain un bonded to create a network of enclosed passageways 50. The enclosed passageways 50 can be used to conduct and distribute the fluid from an inlet 60 to one or more outlet ports 26 between the bonded layers of polymeric material 20 & 30. (The two-dimensional, precision network of enclosed passageways within the lamination might be visualized as analogous of a huge printed circuit for fluid distribution purposes.)

Debris traps 28 may be formed into the bottom layer 20 at the same time as the distribution headers 22, flow restricting passageways 24 and outlet ports 26. The top layer 30 may also contain some or all of these molded or embossed details. Perforations 70 through one or all of the layers 20 & 30 can also be added to the laminated assembly 42 to allow passage of fluids and gases. The perforations 70 are located in areas that do not interfere with the fluid transmitting function of the enclosed passageways 50.

Figure 2:
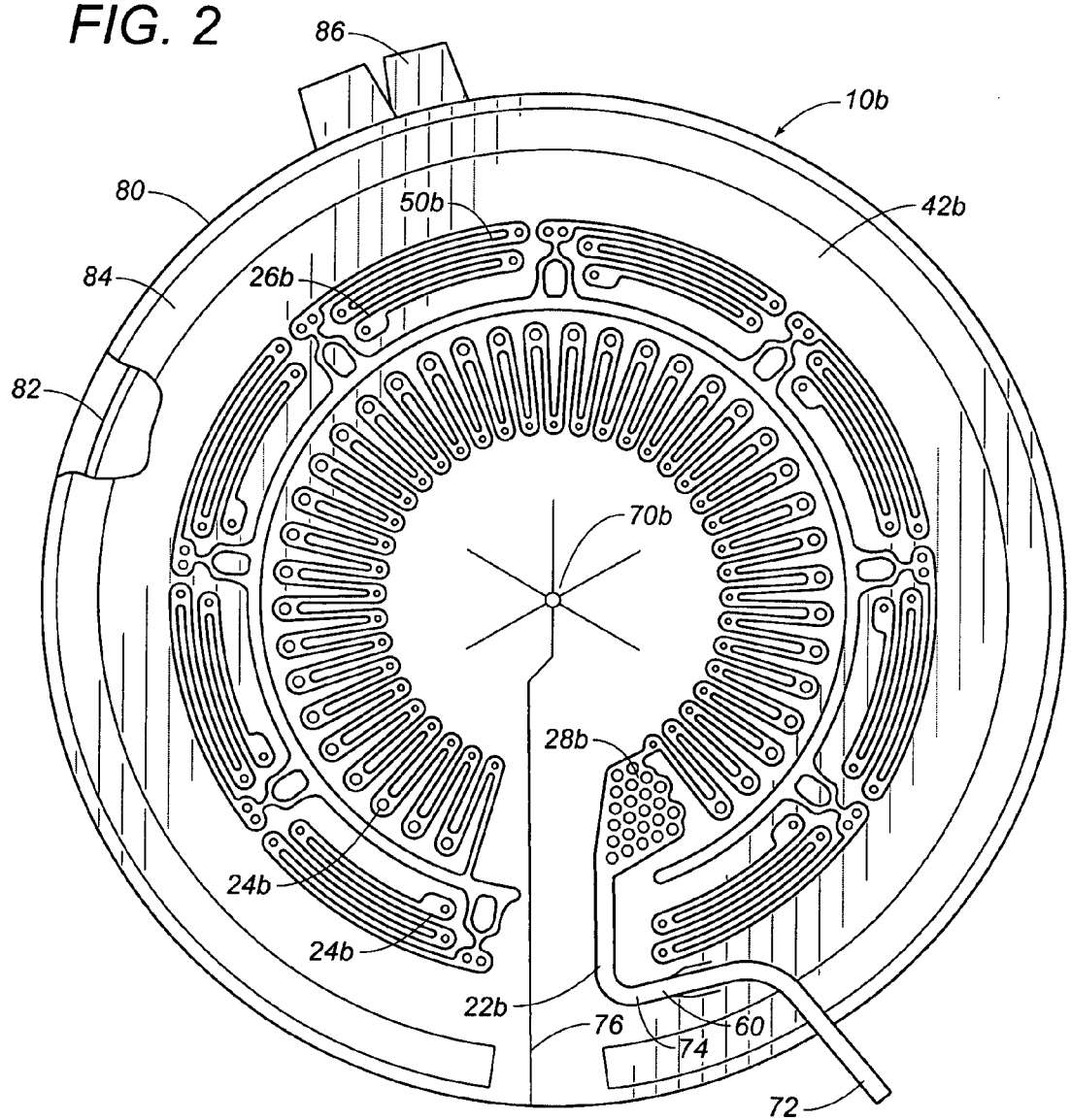
FIG. 2 is a top plan view of one embodiment of the current invention designed for use with a standard growing container.

FIG. 2 depicts a plan view of one embodiment of the current invention, generally indicated at 10b, designed to irrigate woody plants grown in containers. It can be seen how a version of the distribution header 22b, a debris trap 28b, a flow restricting passageways 24b of long length, and multiple outlet ports 26b can be configured into a device for fluid distribution. The distribution header 22b is terminated 74 with a tube 72 thus allowing for attachment of the device 10b to a water source (not shown). In this particular embodiment, the outlet ports 26b are equally spaced around the device 10b. The inside diameter of the tube 72 may need to be small to avoid precipitation of any sediment present in the water supply.

A serrated opening 70b is provided for the plant (not shown) to grow through. An overlapping seam 76 is provided to allow installation around the trunk of the plant without exposing any soil surface. The outer edge 80 is sized to closely fit the container and may optionally have flexible extensions 86 to allow for variations in the container size. Furthermore, a spring 82 is placed within a channel 84 around the perimeter of the laminated assembly 42b to attach the device 10b to the inner wall of the container while also keeping it flat.

In this manner, the laminated assembly 42b provides for the distribution of irrigation water from the inlet 60, thru the network of enclosed passageways 50b, to all of the outlet ports 26b. The laminated assembly 42 also provides a tight fitting cover for the container thus reducing weed germination and surface water evaporation. It is envisioned that this device will be used to irrigate and effectively cover the containers in which woody plants are grown in greenhouses, landscape nurseries, and home applications.

It is obvious that the device can be inverted, if desired, and still function as intended. The laminated assembly 42b can be constructed from any polymeric material and in any color.

Figure 3:
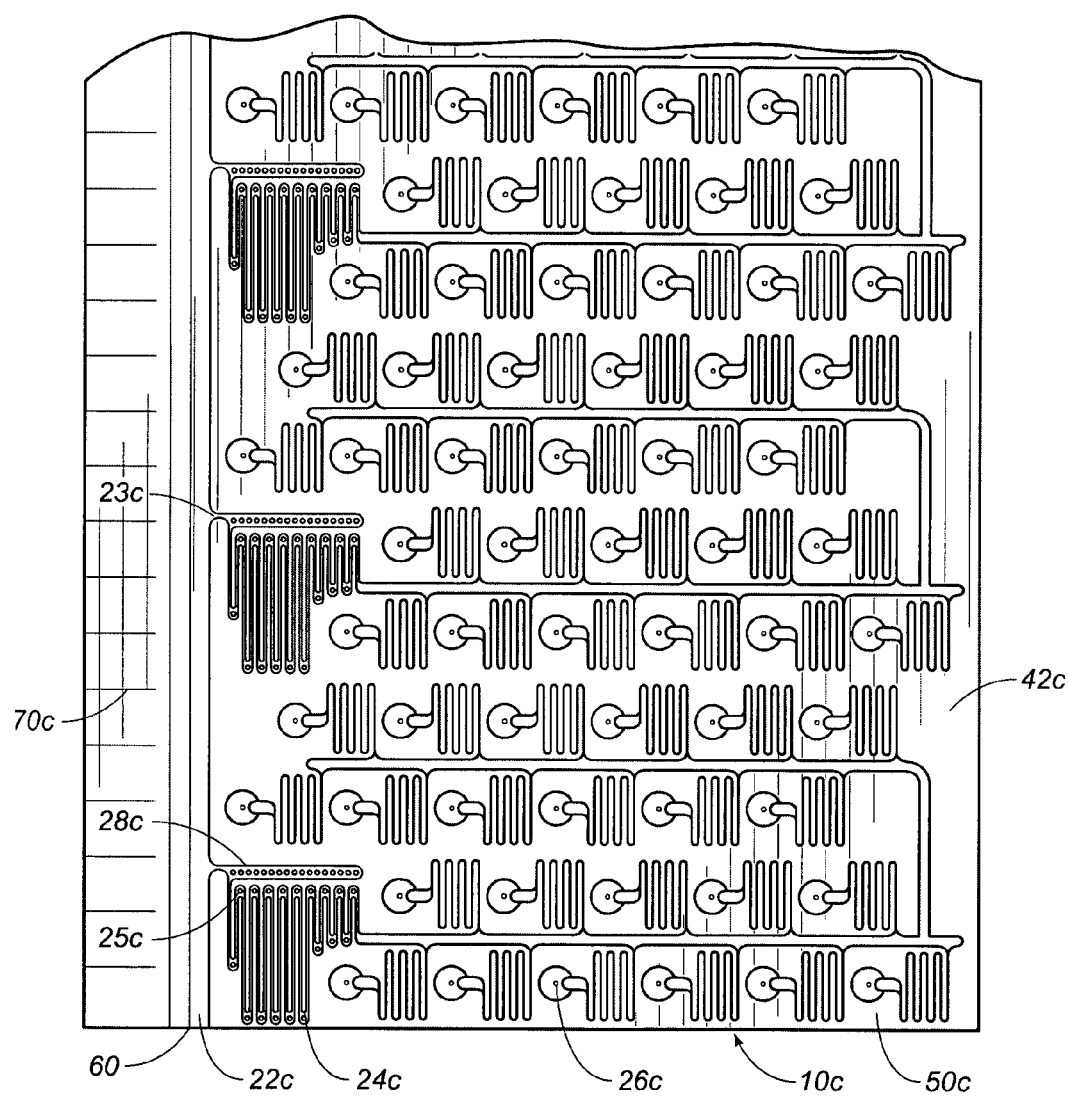
FIG. 3 is a top plan view of one embodiment of the current invention designed for use with trees or woody plants in a row.

FIG. 3 depicts a second embodiment of the current invention, generally indicated at 10c, designed to provide irrigation and mulch to a straight row of woody plants such as experienced in a commercial orchard. In deviation from the construction depicted in FIG. 2, a grid of outlet ports 26c are provided to evenly distribute irrigation water over the entire surface covered by the laminated assembly 42c. A network of enclosed passageways 50c connect the inlet 60 to the outlet ports 26c. The enclosed passageways 50c include a longitudinal distribution channel 22c running down the length of the device 10c. Debris traps 28c are connected at consistent distances along the distribution channel 22c by way of flared connecting sections 23c. Flow restricting passageways 24c are incorporated into the enclosed passageways 50c between the filter 24c and the outlet ports 26c. It is noted that optional debris traps 25c can be included in the flow restricting passageways 24c to catch any debris that might accumulate in the channel between irrigation events.

This embodiment may employ two or more distribution headers 22c rather than one in order to reduce the hoop stress in the thin polymeric film layers which form the distribution headers 22c. This allows the film layers to be thinner. The flow restricting passageways 24c can be as one straight channel which is oriented to run the entire length of the device 10c.

In this manner, the device 10c provides for the distribution of irrigation water from the inlet 60, thru the network of enclosed passageways 50c, to the outlet ports 26c at very low, yet uniform rates over the entire area covered by the device 10c.

Serrations 70c are provided to allow the device 10c to be pulled up around the trunks of the woody plants. In this manner, the laminated assembly 42c also forms a consistent mulch covering to provide weed abatement and reduce water evaporation from the ground surface. The device 10c may be of any length and rolled for handling and shipment.

It is obvious that the device can be inverted if desired, and still function as intended. The laminated assembly 42c can be constructed from any polymeric material and in any color. Furthermore, each side of the assembly 42c can be of a different color to provide a means to change the reflective characteristics of the mulch, if desired.

Figure 4:
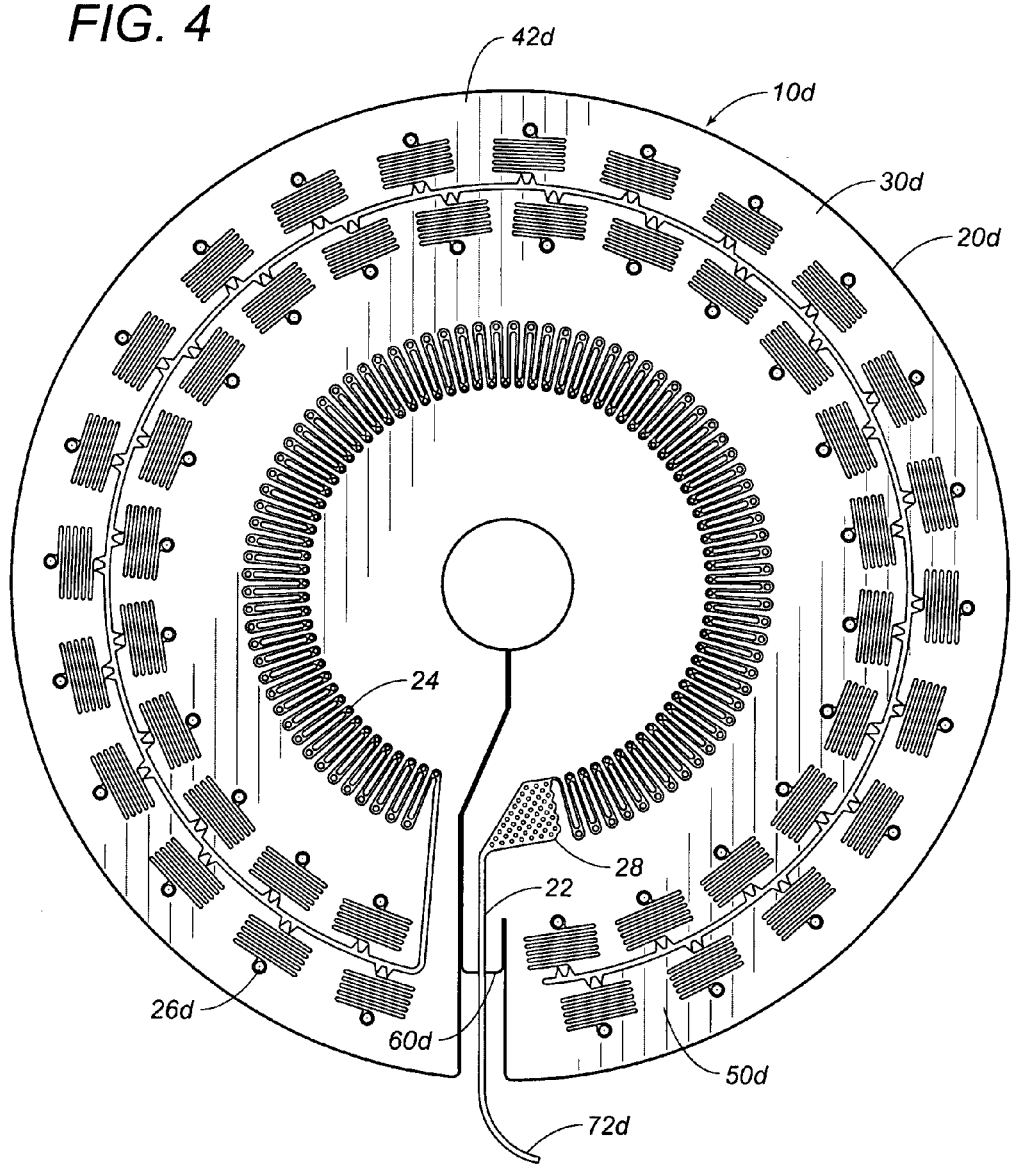
FIG. 4 is a top plan view of one embodiment of the current invention designed for use with larger trees or woody plants at random spacing.

FIG. 4 depicts a third embodiment of the current invention, generally indicated at 10d, designed to irrigate woody plants spaced at inconsistent distances, such as found in home and industrial landscaping. It will be noted that the laminated assembly 42d is made circular and wide enough to act as a mulch ring around the base of the plant. It is connected to a water source by a small diameter tube 72d. The polymeric film layers 20d & 30d may be any color so that the mulch offers the woody plant optimum growing conditions. For example, using black polymeric film on the top layer 30d will result in some additional retained solar heat in the growing medium while white will tend to reflect heat and light. In this manner, inverting the device 10d could present a different color on the upper surface and thus improve growing conditions throughout the seasons. The device 10d may be covered with organic mulch.

The laminated assembly 42d is perforated with output ports 26d. These outlet ports 26d are spaced to provide distribution of irrigation water near the outer edge of the covered surface so as to encourage roots to spread out from the root ball. Due to the additional area provided by the large assembly, the flow restricting passageways 24d can be of sufficient length to assure uniform and extremely low emitter rates.

The device 10d provides for the distribution of irrigation water from the inlet 60d, thru the network of enclosed passageways 50d, to the consistently and optimally spaced outlet ports 26d in an area covered by the laminated assembly 42d at very low, yet uniform, levels.

Figure 5:
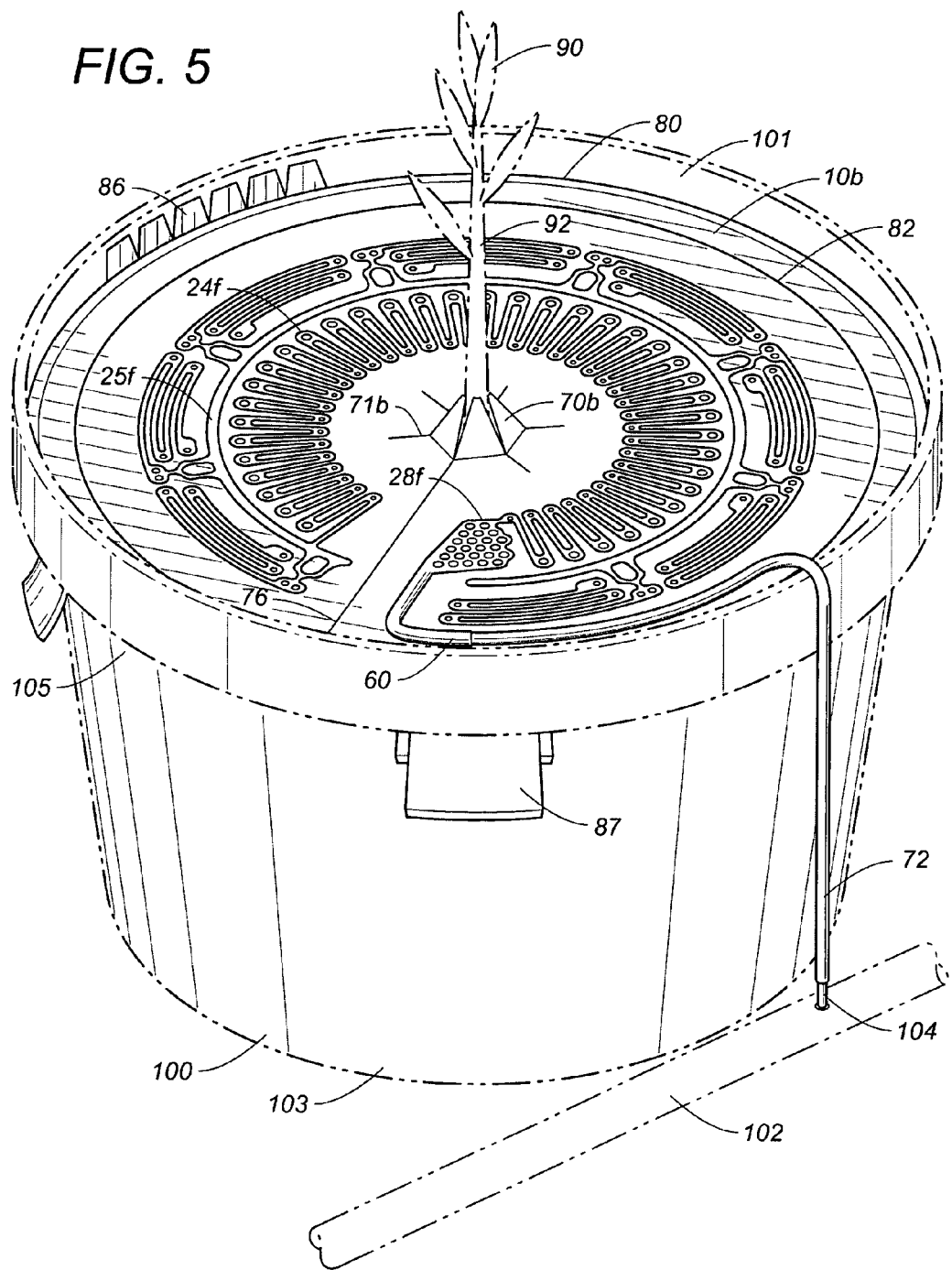
FIG. 5 is a perspective view of the embodiment depicted in FIG. 2 as installed on the container.

FIG. 5 depicts the first embodiment of the current invention in use as intended on a growing container 100. The device, generally indicated at 10b, is again designed to be used to irrigate and effectively cover the containers in which woody plants are grown in greenhouses, landscape nurseries, and home applications. For reference, each polymeric layer would be approximately 0.004 inches thick while the outer edge 80 would have a diameter between approximately 6 and 25 inches, depending on the size of the container 100.

The device 10b is placed around the woody plant 90 by opening the overlapping seam 76 and pulling the serrated opening 70b around the trunk 92. The serrations 71b open to accept the size of the trunk 92. The overlapping seam 76 is then closed. The outer edge 80, overlapping seam 76, spring 82, and optional flexible extensions 86 all act to minimize any opening. The spring 82 also acts to keep the device 10b flat and retain it inside the container 100 by applying an outward force to the container's inner surface 101.

Alternatively, the device 10b may be attached to the container 100. This may be accomplished, for example, by the spring 82 snapping into a recess, or under a lip, in the container wall or other attaching means 87. This includes employing optional flexible extensions 86 pushed through the side of the container. Clips (not shown) may also be used for this purpose.

The tube 72 is simply attached to a water source such as a irrigation lateral 102 by means of a common connector 104. Some strain relief for the tube may be provided by the design of the attachment 60.

Figure 6:
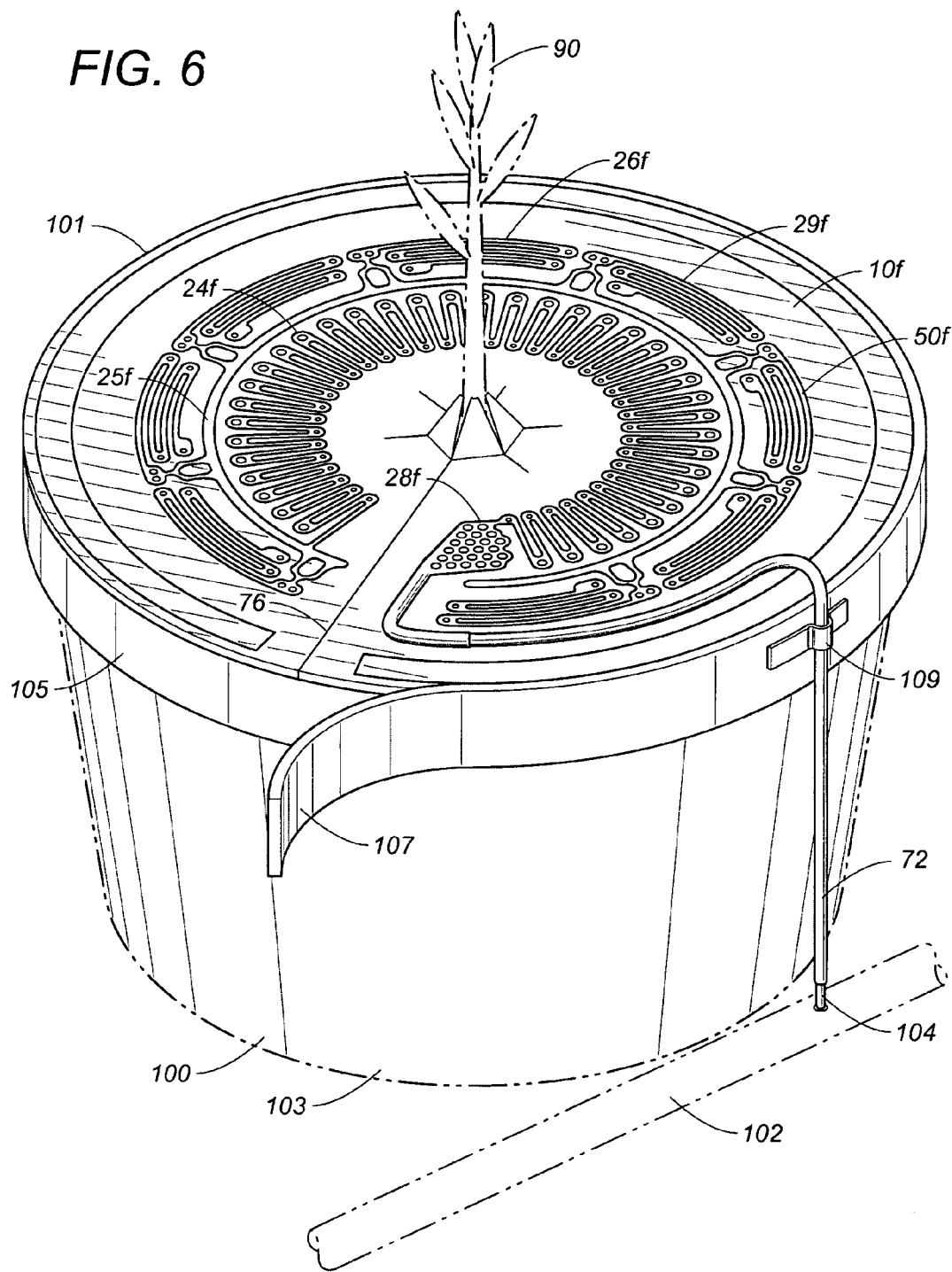
FIG. 6 is another perspective view of the embodiment depicted in FIG. 2 as installed on the container and having an alternative means of attachment.

FIG. 6 depicts an alternative attachment means for the embodiment of the current invention shown in FIG. 2. This embodiment, generally indicated at 10f, is specifically designed to attach over the outer lip 101 and around the outer surface 103 of the growing container 100. The device 10f includes a attachment band 105 which encircles the container 100 and is secured with a closure 107. The closure may consist of an adhesive strip, hook and loop connector, or other semipermanent securing means. The attachment band may contain elastic or other means to provide resiliency for slight variations in container size.

The tube 72 is again simply attached to a water source such as a irrigation lateral 102 by means of a common connector 104. Some strain relief for the tube may be provided by an optional tube restraint 109.

An integral debris trap 28f is provided so that contaminants are settled out of the water stream prior to reaching the small enclosed passageways 50f and retained in the trap. It should be noted that the first set of flow restricting passageways 24f are very long so as to achieve significant flow reduction.

The first set of flow restricting passageways 24f feed secondary distribution header 25f which supplies irrigation water to eight outlet ports 26f through a set of secondary flow restricting passageways 29f. The described network of enclosed passageways 50f are configured to consistently provide water at 0.008 gallons per hour to each outlet port 26f. This rate has been determined to be optimal for woody plant production based upon continuous irrigating six hours per day. A secondary distribution header 25f having a diameter of 0.063 inches has been shown to be capable of delivering this 0.008 gallons of water per hour to the outlets 26f with little variation.

Outlet ports 26f are provided on both sides of the device 10f so that it can be inverted. The outlet ports 26f in the top surface are offset relative to those in the bottom surface so that there is not a hole completely through the assembly where weeds could germinate.

This embodiment allows for use outside of a greenhouse in all climates as excess rain water can be diverted out of the container 100. This allows for a controlled and metered application of irrigation water to the plant 90 the container 100 so as to avoid root rot and leaching of nutrients out of the growing medium.

Figure 7:
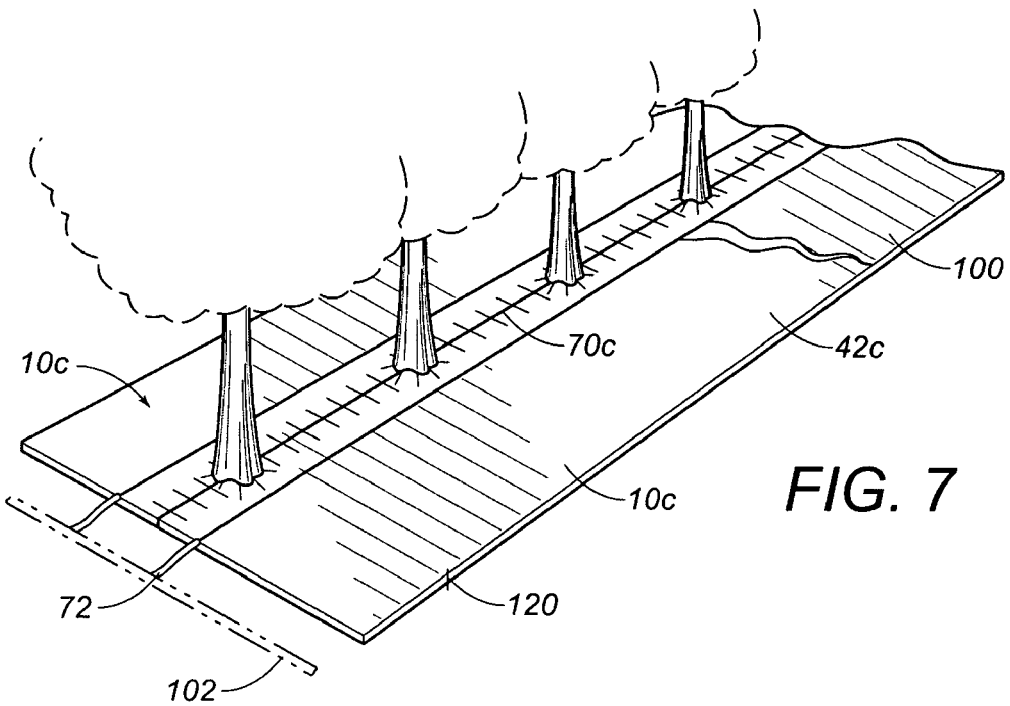
FIG. 7 is a perspective view of the embodiment depicted in FIG. 3 as installed along a row of trees.

FIG. 7 depicts the embodiment of the current invention as shown in FIG. 3 as installed in a orchard. It can be seen that two devices 10c are used in this application with one device on each side of the tree row.

The serrations 70c are pulled up around the trunks of the woody trees. In this manner, the laminated assembly 42c forms a consistent mulch covering to provide weed abatement and reduce water evaporation from the ground surface. A tube 72c is simply attached to a water source such as a irrigation lateral 102. The device 10c may be covered with a layer of organic mulch 110, if desired. Stakes 120 or other means can be used to secure the device 10c to the ground if organic mulch is not used.

Use of this embodiment in a orchard like application results in reduced installation and mowing labor, reduced damage to the trees, minimum water usage with corresponding reduced pollution and fertilizer runoff, elimination of weed control herbicides, and reduced need for insecticides.

Figure 8:
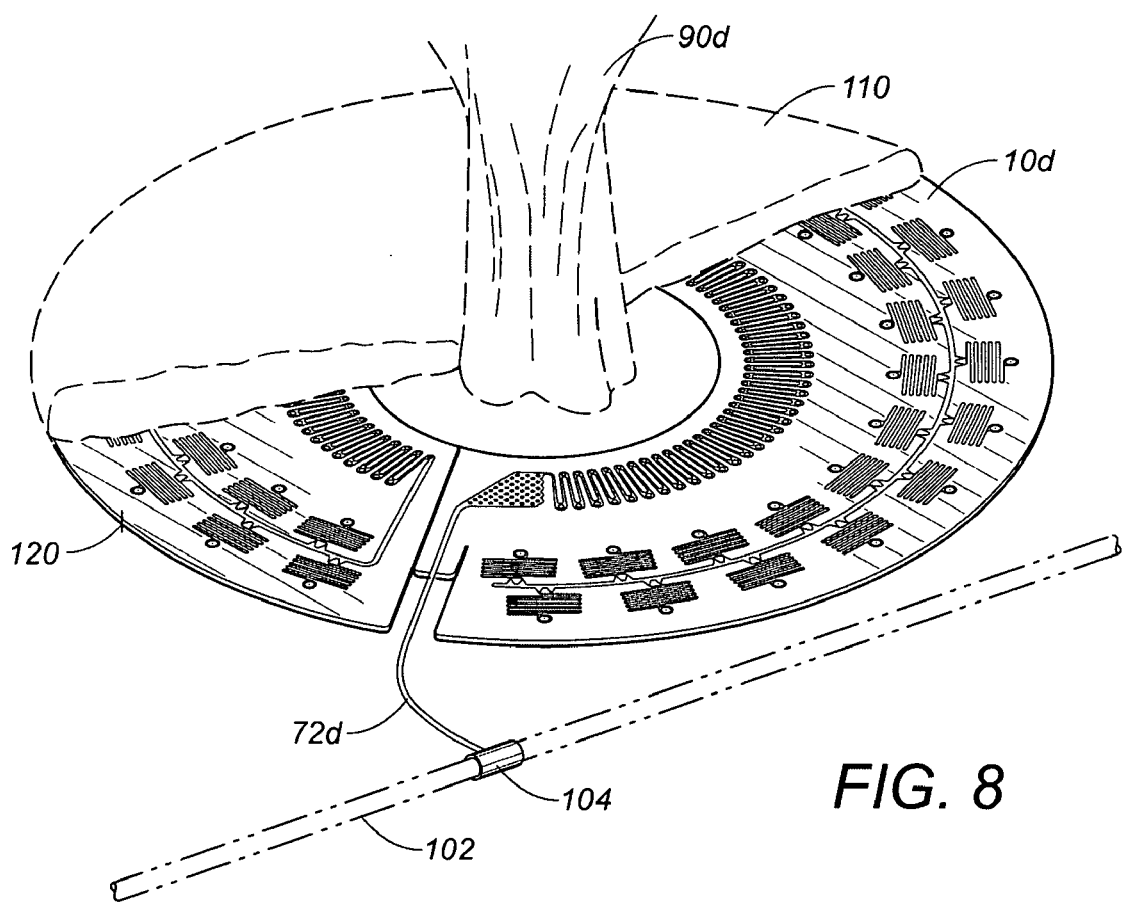
FIG. 8 is another perspective view of the embodiment depicted in FIG. 4 as installed around a shrub.

FIG. 8 depicts the embodiment of the current invention as shown in FIG. 4 as installed around a shrub 90d. It can be seen that the device 10d acts as a mulch ring in addition to providing evenly distributed irrigation. The device 10d may be covered with a decorative layer of organic mulch 110, if desired. Stakes 120 or other means can be used to secure the device 10c to the ground if organic mulch is not used.

For reference, each polymeric layer would be approximately 0.006 inches thick while the diameter would be between 2 and 6 feet, depending on the size of the plant 90. To ease handling and shipping, large versions of this embodiment may be made in segments.

The tube 72d is simply attached to a water source such as a hose 102 by means of a common connector 104. Alternatively, the tube 72d may be attached to a common rain barrel or other water filled container (not shown).

Use of this embodiment around woody plants results in reduced installation and mowing labor, reduced damage to the trees, minimum water usage, elimination of herbicide weed control, and reduced need for insecticides. It also provides critical water after initial planting thus minimizing transplant shock and an optimum growing environment to promote plant growth and health. In addition it minimizes leaching of nitrogen from the soil associated with the breakdown of organic mulch.

Figure 9:
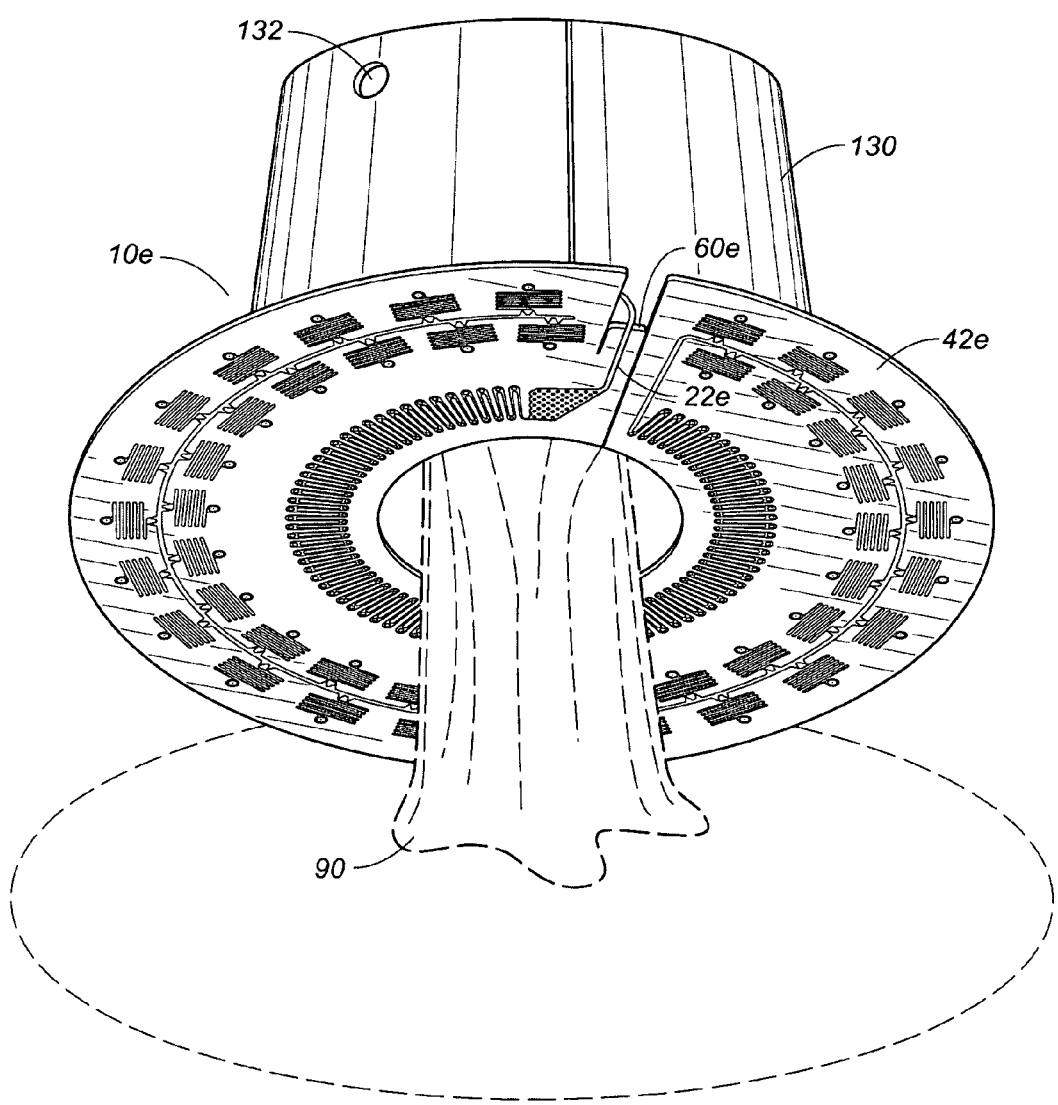
FIG. 9 is a bottom perspective view of an embodiment as installed on the bottom of a fluid-filled container.

FIG. 9 depicts a bottom view of another embodiment of the current invention as installed on the bottom of a fluid filled container 130. This embodiment, generally indicated at 10e, is designed to evenly and slowly distribute the water contained in the fluid filled container 130. This device would be applicable for intermittent irrigation of landscape plants in isolated or outlying locations.

As compared to the previously described embodiments, the inlet 22e is supplied with water from the water filled container 130 into the laminated assembly 42e at attachment 60e. The water filled container 130 would be filled with irrigation water through an port 132 as needed. For reference, each polymeric layer would be approximately 0.004 inches thick and have a diameter of approximately 2 to 4 feet, depending on the size of the fluid filled container 130 and plant 90 being watered.

The slow drip rates from this embodiment in conjunction with a water filled container eliminates the soil compaction problem associated with these types of water delivery systems.

Figure 10:
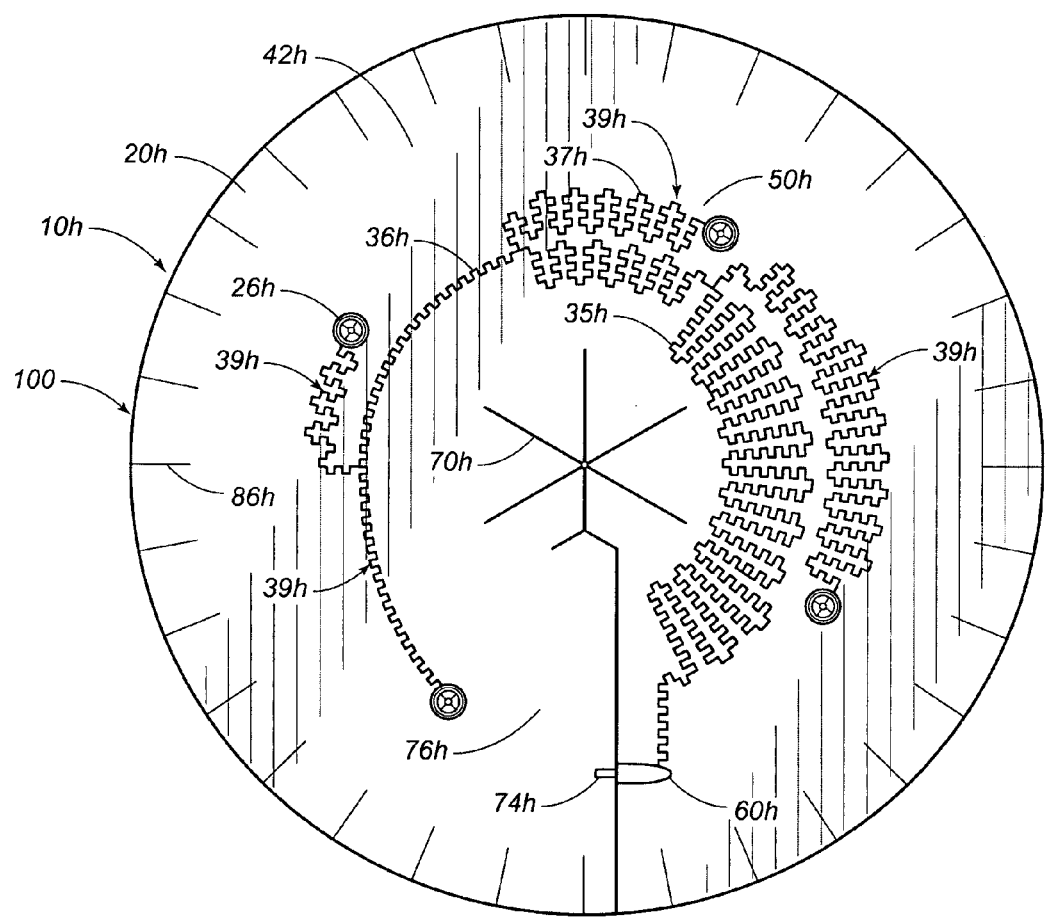
FIG. 10 is another top plan view of a fifth embodiment of the current invention designed for greenhouse container use.

FIG. 10 depicts a plan view of another preferred embodiment of the current invention, generally indicated at 10h, designed to irrigate woody plants grown in containers in greenhouses, landscape nurseries, and home applications. An inlet 60h is terminated with an fitting 74h for connection to a irrigation fluid source (not shown).

The fluid-conveying passageways 50h comprise multiple sections of flow restricting means 35h, 36h, 37b & 39h having various lengths to both distribute the fluid and reduce the fluid pressure. Primary restricting means 35h, 36h, & 37h act as both distribution headers and as flow restriction means. Multiple secondary flow restricting means 39h act to further reduce and balance the fluid flow to each of the outlet ports 26h. This embodiment eliminates the need for a distribution header with large cross section with its inherent potential for sediment accumulation due to low flow velocity. In this particular embodiment, the flow restricting means 35h, 36h & 39h are composed of tortuous paths as practiced by the prior art and also designed to equally space the outlet ports 26h around the circular unitized mat 10h. This tortuous path configuration allows for proper operation when used with smaller container sizes.

A serrated opening 70h is provided for the plant to grow through. An overlapping seam 76h is provided to allow installation around the trunk of the plant without exposure of any soil. The outer edge 100 is sized to closely fit the container and may optionally have flexible extensions 86h to allow for variations in the container size.

The laminated assembly 42h provides a complete cover for the growing media thus decreasing weed germination and surface irrigation fluid evaporation. The laminated assembly 42h can be constructed from any polymeric material and in any color. For example, using black polymeric film on the top layer 20h will result in some additional retained solar heat in the growing medium while white will tend to reflect heat and light. In this manner, inverting the mat 10h could present a different color on the upper surface and thus improve growing conditions throughout the seasons.

Each polymeric material layer would be approximately 0.004 inches thick while the outer edge 100 would have a diameter between approximately 6 and 25 inches, and enlarged or reduced according to the size of the container.

Those trained in the art will recognize that the various features shown as part of any of the abovementioned embodiments can be incorporated into other embodiments, including embodiments not depicted and described herein.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

We claim:

1. A unitized mat to facilitate growing woody plants, comprising:
    at least two polymeric material layers sized and shaped to cover an area immediately around at least one plant and selectively bonded together to define fluid-conveying passageways forming at least one distribution header and at least one flow restricting means, the polymeric material layers having a plurality of perforations extending therethrough;

an inlet means for delivery of a fluid into a first distribution header through the polymeric material layers, said inlet means being in fluid communication with the first distribution header, said flow restricting means extending outwardly from said first distribution header; and an outlet means for dispensing fluid into a root zone area covered by at least one layer of said polymeric material layers and positioned at the perforations, said outlet means being in fluid communication with a second distribution header, said flow restricting means throughout the polymeric material layers being in fluid communication between said first distribution header and said second distribution header, said flow restricting means extending outwardly from said first distribution header to said second distribution header, said outlet means having multiple outlet ports being positioned at said perforations.

2. The unitized mat of claim 1, wherein the polymeric material layers have an opening in which the plant extends therethrough, the plant being a woody plant.

3. The unitized mat of claim 2, wherein said opening is adjustable, said woody plant having variable stem or trunk size.

4. The unitized mat of claim 2, wherein the polymeric material layers have an installation seam extending from said opening to an outer edge of the polymeric material layers.

5. The unitized mat of claim 4, wherein said installation seam has overlapping ends.

6. The unitized mat of claim 1, wherein at least one of the polymeric material layers are removably positioned in a container.

7. The unitized mat of claim 6, wherein at least one polymeric layer covers an area on a surface of said container.

8. The unitized mat of claim 6, further comprising a spring means for extending the polymeric material layers to cover the surface of said container, said spring means contacting at least one of the polymeric material layers.

9. The unitized mat of claim 6, wherein at least one of the polymeric material layers have a plurality of flexible extension flaps extending from the outer circumference thereof.

10. The unitized mat of claim 6, wherein at least one of the polymeric material layers have an outer circumference extending beyond edges of said container.

11. The unitized mat of claim 6, further comprising an anchoring means for restraining at least one of the polymeric material layers to said container, said anchoring means contacting at least one of the polymeric material layers.

12. The unitized mat of claim 1, wherein said outlet means comprise a plurality of outlet means evenly distributed over the area covered by at least one of the polymeric material layers.

13. The unitized mat of claim 12, wherein said perforations are comprised of first perforations and second perforations, said first perforations extending through a first polymeric material layer only, said second perforations extending through a second polymeric material layer only, said first perforations being offset from said second perforations.

14. The unitized mat of claim 1, further comprising an anchoring means for restraining at least one of the polymeric material layers, said anchoring means contacting at least one of the polymeric material layers.

15. The unitized mat of claim 1, wherein said inlet means is in fluid connection with a fluid-filled container.

16. The unitized mat of claim 15, wherein at least one of the polymeric material layers are integral with the fluid-filled container.

17. The unitized mat of claim 1, wherein at least one of the polymeric material layers have a plurality of openings through which plants extend, the plants being woody plants.

18. The unitized mat of claim 1, wherein at least one of the polymeric material layers have a plurality of flexible extension flaps extending from the outer edge thereof.

19. The unitized mat of claim 1, wherein at least one of the distribution headers is comprised of a flow restricting means.

20. A unitized mat to facilitate growing woody plants, comprising:

at least two polymeric material layers sized and shaped to cover an area immediately around at least one plant and selectively bonded together to define fluid-conveying passageways forming at least one flow restricting means, the polymeric material layers having a plurality of perforations extending therethrough;

an inlet means for delivery of a fluid into said flow restricting means through the polymeric material layers, said inlet means being in fluid communication with said flow restricting means; and an outlet means for dispensing fluid into a root zone area covered by at least one layer of said polymeric material layers, said outlet means being in fluid communication with said flow restricting means and comprising a plurality of outlet ports being positioned at said perforations throughout the polymeric material layers, said flow restricting means extending outwardly from said inlet means.

21. The unitized mat of claim 20, wherein the polymeric material layers have an opening in which the plant extends therethrough, the plant being a woody plant.

22. The unitized mat of claim 20, wherein the polymeric material layers have an installation seam extending from said opening to an outer edge of the polymeric material layers.

23. The unitized mat of claim 22, wherein said installation seam has overlapping ends.

24. The unitized mat of claim 20, wherein at least one of the polymeric material layers have a plurality of flexible extension flaps extending from the outer edge thereof.

25. The unitized mat of claim 20 further comprising an anchoring means for restraining at least one of the polymeric material layers.

26. The unitized mat of claim 20, wherein said perforations are comprised of first perforations and second perforations, said first perforations extending through a first polymeric material layer only, said second perforations extending through a second polymeric material layer only, said first perforations being offset from said second perforations.

27. The unitized mat of claim 20, wherein said inlet means is in fluid connection with a fluid-filled container.

28. The unitized mat of claim 27, wherein at least one of the polymeric material layers are integral with the fluid-filled container.

* * * * *